Patented June 18, 1940

2,205,331

UNITED STATES PATENT OFFICE 2,205,331

FILTERING

William H. Alton, New York, N. Y., assignor to R. T. Vanderbilt Company, Incorporated, New York, N. Y., a corporation of New York No Drawing. Application July 6, 1936, Serial No. 89,257

3 Claims. (Cl. 210—203)

This invention relates to improvements in filtering and more particularly it relates to improvements in so-called contact filtration. The invention provides a new and improved process by which such contact filtration may be advantageously effected.

In contact filtration processes the liquid to be refined or purified is admixed with the finely divided contact material and the liquid and admixed material are then subjected to filtration to remove the finely divided material and admixed or absorbed or adsorbed constituents or impurities. The removal of the suspended material is commonly effected by passing the liquid through a filter cloth or fabric which will hold back the finely divided material while permitting the purified or refined liquid to pass therethrough.

In practice, there is a limit to the fineness or mesh of the filtering cloth or fabric, since screens of less than around 100 mesh are expensive and lacking in strength and not well adapted to withstand handling and usage such as scraping of the cloth or fabric to remove deposited materials. On the other hand, the most effective materials for use in contact filtration are those which have a particle size much less than 100 mesh and which would readily pass through a 100 mesh screen.

The present invention provides an improved filtering process which enables full benefit to be obtained from a finely divided contact material such as pyrophyllite of a size, e. g., that passes through a screen of 200 or 250 mesh and with particles which may be as small as one micron, the process being carried out with filtration through ordinary filter screens of, e. g., 27 by 100 mesh.

The new process involves the use of a filtering medium which is made up for the most part of a finely divided contact or absorbent material such as pyrophyllite having particles below, e. g., 200 mesh and of a size down to as small as about 1 micron, intimately admixed with and associated with a coarser non-abrasive fibrous or porous material having particles or fibres of a size greater than about 100 mesh, and with the fine particles so intimately admixed or associated with the coarser fibrous or porous particles as to give a composite material substantially homogeneous in character.

A coarser fibrous material which is particularly advantageous for use in practicing the new process is asbestos in the form of particles or fibres of a size, e. g., which may be sifted through a 14 mesh screen and may contain fibres passing up to a 100 mesh screen, when the composite medium is to be used on a screen of about 27 by 100 mesh, that is, a screen with 100 wires to the inch in one direction and 27 to the inch in the other direction, which is a common size of filter screen.

The asbestos fibres which are particularly advantageous are the asbestos fibres commonly termed "floats," which are ordinarily waste. These asbestos fibres by themselves would not be particularly effective in contact filtration and in particular would not effectively remove the finer particles from the material to be filtered which are desirably removed in contact filtration processes.

The structure of the larger particles or fibres of the asbestos is such that the fine pyrophyllite particles appear to stick to the asbestos and to fill the interstices and crevices between the fibres in such a way as to produce a composite aggregate made up of the individual particles or fibres of asbestos and the finer particles of pyrophyllite intimately associated therewith.

The properties of the asbestos fibres and of the pyhophyllite are such that when admixed in suitable proportions a homogeneous mixture is obtained which may be shipped in a dry state without objectionable separation or segregation, and which, when added to a liquid, appears to retain the intimate association of the particles even though there may be a considerable excess of the fine pyrophyllite particles admixed with the aggregate.

The proportions of asbestos and pyrophyllite in the filtering medium vary, and the proportion of asbestos fibres may advantageously vary from around 6% to around 12 to 15% where the fibres are of a size which may be sifted through a 14 mesh screen but not through a 100 mesh screen, and where the size of the pyrophyllite particles is such that they will pass through a 250 mesh screen.

While asbestos fibres alone give a relatively ineffective and coarse filtering medium, when the pores and interstices between these fibres are filled with pyrophyllite and when the fibres are admixed with a large proportion of a fine pyrophyllite, the resulting composite product forms an effective contact filtering composition which is not subject to the objections and difficulties encountered in the use of the finely divided material by itself.

The asbestos fibres are particularly advantageous for use as the fibrous material in the composite medium used in the process, because such material is quite cheap, the preferred type of asbestos being that known as "floats," which is generally a waste product, and because the fibres are resistant to acids and to alkalies, and are not readily subject to deterioration. In place of, or in addition to, the asbestos fibres, other fibrous or porous material may be used with advantage, such products as glass wool, rock wool, and mineral wool, having many of the advantageous properties of the asbestos, particularly as regards the resistance to the action of acids and alkalies and deterioration.

The new process of filtering liquids to refine or purify them by removing suspended and other impurities thus comprises adding to the liquid to be purified some finely divided pyrophyllite, substantially all of which will pass a 200-mesh screen, and a coarser fibrous material such as asbestos, glass wool, rock wool, or mineral wool, the resulting liquid and admixed filtering material then being filtered through a filter substantially coarser than 200-mesh, whereby a filtering bed of admixed fibrous material and pyrophyllite is built up to insure a fine straining action on the liquid passing through the filter.

In practicing the new process the composite medium consisting of finely divided pyrophyllite and coarser fibrous material, e. g., asbestos, is admixed with the liquid to be refined or filtered in much the same manner that contact filtering media are now used, but with the advantages resulting from the use of the composite material having the finely divided pyrophyllite in association with the fibrous particles, or the porous particles, both in the refining treatment itself and in the subsequent removal of the contact medium by filtration. The composite medium can thus be added in a dry state to the liquid to be refined or filtered, and intimately admixed therewith to permit absorption or adsorption of impurities, etc., on the finely divided material; and the liquid and admixed filtering agents can then be passed through a filter, such as a pressure filter or a vacuum filter, or gravity filtration may be used. The presence of the fibrous particles, or the porous particles, or of aggregates of the fibrous particles or porous particles and the fine particles of pyrophyllite permits the ready removal of the filtering material by an ordinary filter screen through which the fine particles of pyrophyllite would otherwise freely pass, and in this way the filtering medium is removed; both the fibrous or porous material, the aggregates of finely divided pyrophyllite and fibrous or porous material, and the finely divided pyrophyllite being completely removed.

In the handling of various liquids which are to be subjected to contact filtration it is frequently necessary to pump the liquids, and the presence of coarse particles of abrasive material would be objectionable. The presence of the composite aggregates or particles of the filtering medium has no objectionable abrasive action and the liquid and admixed medium can be readily pumped, e. g., with a centrifugal pump.

The new process can be advantageously used in refining or purifying various liquids, such as, for example, the purifying of cleaners' naphtha. When such naphtha is used for cleaning clothes it requires refining or purification before it can be used over again. The admixture of a small amount of finely divided pyrophyllite and fibrous material such as asbestos with the impure cleaners' naphtha and the filtering of the admixed naphtha, pyrophyllite and asbestos through a pressure filter results in effective removal of the pyrophyllite and fibrous asbestos as well as effective adsorption or absorption or physical removal of suspended and other impurities, giving a purified cleaners' naphtha which can be used over again. The new process may be carried out by adding the pyrophyllite and fibrous asbestos to the cleaners' naphtha before or during the cleaning of clothes therewith, so that it is present in the naphtha during the cleaning operation, and it is readily removed from the clothes with the naphtha such that the naphtha can then be subjected to filtration in a continuous manner and the purified naphtha can then be returned for use, e. g., in rinsing the clothes, recirculating the same naphtha through the clothes with the purification of the naphtha by the use of the composite filtering material and the filtering of this material and impurities from the naphtha as a part of the cycle.

The effectiveness of the new process is such that when used for the refining and purification of cleaners' naphtha, the redistillation cost, that is, the cost of distilling the naphtha to purify and recover it as is commonly done, may be drastically cut. The naphtha can be used many more times without requiring distillation to purify and refine it.

The process of the present invention may be also used with advantage for the contact filtration of such materials as gasoline, reclaimed oil, oils and fats, mineral oils, sugar solutions, beer, cider, vinegar, liquors, fruit juices, etc. In some cases, as with cleaners' naphtha, it may be desirable to incorporate a small proportion of bleaching clay, e. g., 10% in the composite pyrophyllite and fibrous asbestos filtering medium to aid in decolorizing the material filtered. Pyrophyllite removes suspended material and dirt from liquids effectively, but does not decolorize the liquid. Where a decolorizing action is desired, a small proportion of bleaching clay or other bleaching agent, admixed with the pyrophyllite and fibrous asbestos makes the filtering medium more effective in that it provides a medium which not only serves to remove suspended matter but also serves to decolorize.

I claim:

1. In the filtering of liquids to refine or purify them by removing suspended and other impurities, the improvement which comprises adding to said liquid finely divided pyrophyllite, substantially all of which will pass a 200 mesh screen, and a coarser fibrous material from the class consisting of asbestos, glass wool, rock wool and mineral wool, filtering the resulting liquid and admixed filtering material with a filter substantially coarser than 200 mesh whereby a filtering bed of admixed fibrous material and pyrophyllite is built up to insure a fine straining action on the liquid passing through the filter.

2. In the filtering of liquids to refine or purify them by removing suspended and other impurities, the improvement which comprises adding to said liquid finely divided pyrophyllite, substantially all of which will pass a 200 mesh screen, and coarser asbestos fibers, filtering the resulting liquid and admixed filtering material with a filter substantially coarser than 200 mesh whereby a filtering bed of admixed asbestos and pyrophyllite is built up to insure a fine straining action on the liquid passing through the filter.

3. In the filtering of liquids to refine or purify them by removing suspended and other impurities, the improvement which comprises adding to said liquid finely divided pyrophyllite, substantially all of which will pass a 200 mesh screen, and asbestos fibers, substantially all of which will pass a 14 mesh screen but will be retained on a 100 mesh screen, filtering the resulting liquid and admixed filtering material with a filter substantially coarser than 200 mesh whereby a filtering bed of admixed asbestos and pyrophyllite is built up to insure a fine straining action on the liquid passing through the filter.

WILLIAM H. ALTON.